Patented Jan. 5, 1937

2,066,330

UNITED STATES PATENT OFFICE

2,066,330

CHEMICAL PRODUCTS AND PROCESSES FOR PRODUCING SAME

Wallace H. Carothers and Arnold M. Collins, Wilmington, and James E. Kirby, Arden, Del., assignors to E. I. du Pont de Nemours & Company, Wilmington, Del., a corporation of Delaware No Drawing. Application January 25, 1936, Serial No. 60,882

26 Claims. (Cl. 260—2)

This invention relates to modified halogen-2-butadiene-1,3 (for convenience hereinafter referred to as "haloprene") polymers. More particularly it relates to polymerization of the haloprenes, especially chloro-2-butadiene-1,3 (hereinafter for convenience called "chloroprene") in the presence of vinyl compounds.

This application is a continuation-in-part of an application of Carothers, Collins and Kirby, Serial No. 665,554, filed April 11, 1933, now matured into U. S. Patent No. 2,029,410, and of an application of the same inventors, Serial No. 519,242, filed February 28, 1931, and now matured into U. S. Patent No. 1,967,860.

It is known that haloprenes, that is, compounds of the general formula $CH_2=CXCH=CH_2$ in which X represents halogen, polymerize readily to rubber-like products. Unless the polymerization is discontinued before 20 to 40 per cent has polymerized or unless the polymerization is modified, non-plastic products are generally obtained which cannot be milled satisfactorily. Another defect of the unmodified haloprene polymers is that they tend to stiffen on aging. This stiffening or freezing takes place slowly at ordinary temperatures and quite rapidly at temperatures below 10° C.

An object of this invention is to prepare new and useful compositions from haloprenes. Another object is to produce new polymers of rubber-like or resin-like character from haloprenes. Still another object of this invention is to convert haloprenes into polymers which show less tendency to stiffen on aging than unmodified haloprene polymers. A further object is to prepare plastic haloprene polymers in good yield. A more specific object is to polymerize haloprenes in the presence of vinyl compounds. A still more specific object is to polymerize chloroprene in the presence of vinyl compounds and to produce polymers of chloroprene of the types described for the haloprenes broadly. Other objects will appear hereinafter.

These objects are accomplished by polymerizing a haloprene in the presence of a vinyl compound of the class consisting of vinyl ethers, vinyl esters, vinyl carbinol (allyl alcohol), esters of vinyl carbinol, vinyl acetylenes, vinyl aromatic hydrocarbons and vinyl aromatic compounds consisting of carbon, hydrogen, halogen and alkoxy groups, the halogen and alkoxy groups being present as substituents on a carbon atom of an aromatic ring. The preferred haloprene is chloroprene.

The present invention, therefore, is concerned with the polymerization of haloprenes in the presence of vinyl compounds to produce polymeric products which, as is indicated hereinafter, are believed to be interpolymers. For convenience, the invention will be described with particular reference to the haloprene, chloroprene (chloro-2-butadiene-1,3). The methods of causing chloroprene to polymerize in the present invention do not differ from those set forth in earlier chloroprene applications and patents, but the particular method chosen will depend on the nature of the added vinyl compound and the type of product desired. For example, the polymerization may be carried out by the method of U. S. Patent No. 1,950,436 (1934), in which plastic polymerizable polymers are obtained, or the mixture may be polymerized in aqueous emulsion as shown in U. S. Patent No. 1,967,861 to obtain a synthetic latex having desirable properties. Any of the catalysts and inhibitors described in previous applications and patents may be used, and the mixtures may be polymerized in the presence or absence of any of the following: light, heat, air or oxygen, inert solvents, and diluents. Pressures ranging from less than 1 atmosphere to 6000 atmospheres may be employed.

Polymeric products of widely different properties are obtained by the process of this invention. Products ranging from viscous oils to resins or rubber-like products can be prepared by suitable choice of vinyl compound and polymerizing conditions. It is possible to prepare high yields of plastic haloprene polymer. The rubber-like polymers prepared according to the methods of this invention show much less tendency to stiffen than unmodified haloprene polymers.

The invention is more fully illustrated by the following examples in which the term "parts" refers to "parts by weight." These examples, however, are intended to be illustrative only and are not to be construed as limiting the scope of the invention.

Example 1

A solution of 10 parts of styrene in 40 parts of chloroprene was emulsified in 50 parts of 2% sodium oleate solution with the aid of high-speed stirring. The emulsion was stored at 0–10° C. for 48 hours. It was then stabilized by the addition of 1 part of phenyl beta-naphthylamine and 5 parts of 3% ammonium hydroxide solution. A film of the latex was flowed on a porous plate. After most of the water had soaked into the plate there remained a film of rubber-like polymer.

The film was cured by heating at 80° C. for 48 hours. The finished product resembled soft vulcanized rubber. The film had good tensile strength, and remained pliable at room temperature for several weeks, whereas a similar film prepared with unmodified chloroprene polymer became stiff within a few days.

Rubber articles prepared from the modified chloroprene latex, like those of unmodified chloroprene latex, require no vulcanization and the modified rubber retains the properties indicated above. The latex is admirably suited to the preparation of coated and impregnated cloth and paper because of the softness and pliability of the synthetic rubber.

Example 2

A solution containing 25 parts of chloroprene, 25 parts of styrene, and 0.1 part of benzoyl peroxide was emulsified in 50 parts of 2% sodium oleate solution. The emulsion was allowed to polymerize for 48 hours at 0–10° C., and was then stabilized as described in the preceding example. A film prepared from this latex remained soft and pliable for months, whereas the unmodified chloroprene control became stiff in a few days.

Example 3

A mixture consisting of 30 parts chloroprene, 30 parts vinyl acetate, 60 parts toluene, 0.6 part benzoyl peroxide, and 0.2 part of ethylene oxide was heated in a stainless steel bomb for four hours at 110° C. The interpolymer obtained in this way (19 parts) was a soft plastic resin. It had a chlorine content of 35.61% indicating that it contained 11.1% polyvinyl acetate. The product is useful as the resinous ingredient in coating and molding compositions.

Example 4

A mixture consisting of 45 parts of vinyl chloride, 5 parts of chloroprene, 10 parts of vinyl acetate, 60 parts of toluene, 0.6 part of benzoyl peroxide, and 0.2 part of ethylene oxide was heated in a stainless steel bomb for four hours at 110° C. The interpolymer obtained was a brown resin readily soluble in toluene. Films flowed from the toluene solution had good flexibility and adhesion characteristics. The polymer is useful in the preparation of lacquers and pigmented coating compositions.

Example 5

A solution containing 12 parts of vinyl chloride, 4 parts of chloroprene, 0.1 part of uranyl nitrate, and 90 parts of methanol was exposed to sunlight in a soft glass vessel. After several days' exposure to sunlight, 2.2 parts of brown alcohol-insoluble resin was removed from the reaction flask. This resin was soluble in acetone and in toluene. Polyvinyl chloride prepared in a similar manner in the absence of chloroprene is insoluble in toluene, whereas polymerized chloroprene prepared in the absence of vinyl chloride is insoluble in acetone. This indicates that the resin contained chloroprene and vinyl chloride in chemical combination. The interpolymer gave films which were more flexible than those prepared from polyvinyl chloride alone.

Although interpolymers of vinyl chloride and chloroprene can be obtained both by heat and sunlight polymerization, the yields are generally poor. Chloroprene greatly retards the rate at which the vinyl chloride polymerizes.

Example 6

Ninety parts of chloroprene and 10 parts of divinyl acetylene were placed in a soft glass bottle and exposed to the light of a Cooper-Dewitt lamp for 47 hours. After this length of time the solution was very viscous and contained about 25% of polymerized material. It was poured into alcohol and the precipitated plastic mass was thoroughly washed with alcohol and dried by milling on cold rolls. The plastic interpolymer was compounded according to the following formula and cured in a mold at 125° C. for 25 minutes.

| | Parts |
|---|---|
| Interpolymer | 100 |
| Phenyl beta-naphthylamine | 1.5 |
| Zinc oxide | 10.0 |
| Benzidine | 1.0 |
| Stearic acid | 1.0 |

The cured product was strong and elastic and closely resembled soft vulcanized rubber. While the product was not so strong as unmodified chloroprene polymer, it remained pliable for a longer period than the unmodified product.

Example 7

A solution of 8 parts of vinyl naphthalene in 72 parts of chloroprene was emulsified in 80 parts of a 2% sodium oleate solution by the aid of high speed stirring. The emulsion was stored at 10° for 24 hours. It was then stabilized by the addition of 7 parts of 3% ammonium hydroxide solution and 1.5 parts of ethyl beta-naphthylamine in emulsion form. Films were prepared from the latex as described in Example 1. After drying at 70° C. for 20 hours, the films were strong and elastic, resembling soft vulcanized rubber. The films remained pliable for several weeks, much longer than the control films containing no vinyl-naphthalene. The films had a tensile strength of 1075 lbs./in.$^2$ and broke at an elongation of 860%.

Example 8

A 5% solution of alpha-vinyl naphthalene in chloroprene was allowed to stand at room temperature in the dark for eight days. The interpolymer present (51%) was then separated by thorough washing with methanol, a solvent for the monomers but not for the polymers. The polymer was readily soluble in benzene and milled satisfactorily. When chloroprene alone is allowed to stand at room temperature until 51% has polymerized, the product is elastic, difficultly soluble in benzene, and has poor milling properties. The interpolymer can be compounded and cured as described in Example 6.

Example 9

A mixture of 4 parts of chloroprene, 2 parts of vinyl butyl ether, 0.6 part of benzoyl peroxide, and 4 parts of toluene was heated in a sealed glass tube at 95–100° C. for 65 hours. On washing the resultant polymer with alcohol and drying, there was obtained 4.1 parts of sticky, rubber-like polymer. This polymer contained 34.01% chlorine, indicating that it consisted of chloroprene and vinyl butyl ether in an 84:16 ratio. The interpolymer was plastic and readily soluble in toluene. Interpolymers containing higher percentages of vinyl butyl ether were prepared more easily by using iodine as catalyst.

Example 10

A solution of 8 parts of vinyl butyl ether in 72 parts of chloroprene was emulsified in 80 parts of 2% sodium oleate solution by means of vigorous agitation. The emulsion was stored at 10° C. for 24 hours and was then stabilized by the addition of 7 parts of 3% ammonium hydroxide and 1.5 parts of ethyl betanaphthylamine in emulsion form. Films flowed from the latex and dried at 70° C. for 17 hours were strong and elastic resembling soft vulcanized rubber. The film remained pliable at room temperature for several weeks, whereas an unmodified chloroprene film prepared in the same manner became stiff within a few days.

While the examples all deal with the polymerization of chloroprene, the invention is not limited to this haloprene. Other haloprenes, e. g., bromoprene and iodoprene, may also be interpolymerized with the vinyl compounds. It is also within the scope of this invention to interpolymerize a haloprene or a mixture of haloprenes with one or more vinyl compounds.

The vinyl compounds which may be used include vinyl ethers, vinyl esters, vinyl carbinol (allyl alcohol), esters of vinyl carbinol, vinyl acetylenes, vinyl aromatic hydrocarbons and vinyl aromatic compounds consisting of carbon, hydrogen, halogen and alkoxy groups, the halogen and alkoxy groups being present as substituents on a carbon atom of an aromatic ring, as set forth above, but it should be understood that wherever the term "vinyl" is used throughout the specification and claims of this application, it is intended to refer to the group $CH_2=CH-$ or to a compound containing that group, and that by the term "vinyl esters", as used herein, is meant esters of vinyl alcohol or compounds which can be theoretically considered to be such esters, whether or not they may be directly derived by reacting vinyl alcohol with the appropriate acid. Among other vinyl compounds which may be used in this invention are vinyl bromide, vinyl formate, vinyl butyrate, vinyl benzoate, vinyl oleate, vinyl chloroacetate, allyl chloride, divinyl benzene, vinyl chlorobenzene, vinyl anisol, vinyl ethyl ether, vinyl oleyl ether, divinyl ether, vinyl beta-chloroethyl ether, vinyl phenyl ether, vinyl acetylene, vinyl methyl acetylene, vinyl ethyl acetylene, and vinyl acetylenic compounds such as vinylethinyl-dimethyl carbinol $$(CH_2=CHC\equiv CC(OH)(CH_3)_2).$$

As has been inferred above, it is an object of this invention to modify the properties of haloprene polymers. It will be obvious that a further object is to confer on vinyl polymers the properties of haloprene polymers. The invention, therefore, is not limited to the proportions set forth in the examples and the amount of haloprene in the unpolymerized mixture or of the haloprene polymer in the polymerized mixture may vary from 1% to 99% of the total or even more widely as long as an appreciable amount of the haloprene and of the vinyl compound is present. Thus, it is possible to prepare products having preselected properties, by choosing the proper proportion of constituents.

Although the proportions of the various constituents exhibit a marked influence on the final product, they do not completely determine its properties which, as has been stated, are dependent as well on the conditions of the polymerization. Many variations in these conditions have already been discussed. In addition, however, the conditions may be further varied by using a continuous flow method of polymerization, such as is described in U. S. Patent No. 1,867,014, instead of using a batch process as indicated in the examples. Diluents and solvents may be used in the preparation of the interpolymers either alone or in combination with dispersions of the materials which are polymerized. The solvents used may be either solvents or non-solvents for the polymerized material. Temperatures ranging from 0° to 110° C. are mentioned in the examples but, although these are preferred, the invention is not so limited. Useful products may be obtained when using higher or lower temperatures. These temperatures are, however, preferred only for the first polymerization step. The curing of the compounded polymer preferably takes place at about 125° C., although variations from this temperature are also permissible.

Although only alkaline dispersions are illustrated by the examples the broad invention is not so limited. Acid dispersions are also contemplated. The dispersions may be modified by the addition of suitable solvents, both high and low boiling, acid acceptors such as proteins, catalysts, inhibitors, etc. Other modifications include polymerization in dispersion media other than water.

Time is an important factor in both the first polymerization step and the curing. The examples indicate that the time of exposure to the polymerizing influence is by no means fixed, although the time of exposure does, to a large extent, determine the properties of the final product. No exact times can be given, however, in view of the fact that the stage of polymerization reached in a given time depends also to a large extent on other factors discussed herein. The time required to produce a given product can, of course, be determined by polymerizing a test sample under selected conditions and observing the nature of the product at frequent intervals, as will be obvious to one skilled in the art.

While the rate of polymerization appears to be favorably affected by the presence of oxygen, polymerization may be carried out in the substantial absence of oxygen. Interesting variations in the final product may in this way be produced.

In the preparation of emulsions as described above, the invention is not limited to the emulsifying agent already mentioned nor to the quantities employed in the example. Any emulsification agent appears to function satisfactorily when used in sufficient quantity. In addition to those already named, the fat alcohol sulfates or sulfonates or their derivatives or the alkyl naphthalene sulfonic acids as well as the quaternary ammonium salts, containing long chain saturated hydrocarbon radicals and related compounds will be found to function satisfactorily. The quantity of each to be used may, in general, be determined from their known effectiveness in other similar uses.

In the examples, the vinyl compounds were added to the chloroprene prior to polymerization. It is within the scope of the present invention to add the vinyl compound to the chloroprene during its polymerization, or to add the chloroprene to the partially polymerized vinyl compound and then to continue the polymerization. The interpolymerizations may also be carried out in the presence of other polymerizable materials and film-forming materials, such as resins, cellulose derivatives, plasticizers, drying oils, etc. The conditions selected for polymerizing chloroprene with a given vinyl compound will depend upon the ease with which the vinyl compound polymerizes and upon the type of product desired. In general, use of solvents, polymerization catalysts, and elevated temperatures leads to the formation of low molecular weight soluble polymer. Interpolymers containing a preponderance of chloroprene are usually rubber-like.

As already stated, products having most diverse properties can be prepared by a suitable choice of conditions of polymerization and type and amount of vinyl compound used with the chloroprene. It is not possible to draw any exact generalizations concerning the properties of these products, but it may be said that when polymerized chloroprene predominates (50% or more) the products are usually rubber-like, but if the added ingredients are present in larger amounts the product will resemble those ingredients or their polymers, except that it generally has a toughness and elasticity similar to that of polymerized chloroprene. The products will range from viscous oils to strong plastic masses, elastic extensible rubber-like materials, tough resinous masses, or hard brittle resins. Some of them have properties which make them very useful as rubber substitutes for the preparation of molded, dipped, coated, and extruded articles, while others are valuable as adhesive, impregnating, and film-forming materials. It is, therefore, apparent that the particular proportions to be used will in each case depend upon the properties which are desired in the final product.

The properties of the product of the polymerization also vary with extent to which polymerization is permitted to take place. It may be stopped at an intermediate stage to isolate a plastic product which may be compounded and/or molded and cured. Alternatively, it may be carried to a more advanced stage at which a less plastic or non-plastic product is obtained.

The products formed by polymerizing haloprenes in the presence of vinyl compounds are often quite different from polymers of either of the two individual unsaturated compounds. In addition, the products differ from those obtained by mechanically mixing the polymerized haloprene with the polymerized vinyl compound. In fact, it is sometimes impossible to prepare homogeneous mixtures or solutions of the separately prepared polymers due to lack of solubility, plasticity, and the like. Products obtained by polymerizing haloprenes in the presence of other polymerizable compounds have been referred to as "interpolymers" and the process is termed "interpolymerization". By defining the terms in this way, it is not intended to limit the invention to claiming that interpolymers are necessarily chemical combinations of the two polymerizable materials. In certain instances, however, data has been presented to show that this is actually the case.

Since products of widely varied properties can be obtained by the methods of this invention, the products are useful in many applications. The rubber-like products are useful as rubber substitutes, as molding ingredients, etc. The resinous products may be used as ingredients in coating compositions, molding compositions, impregnating compositions, adhesives, sizing compositions, etc. In applying the products of this invention, it is often desirable to admix them with pigments, dyes, anti-oxidants, and other modifying agents, such as resins, oils, plasticizers, fillers, cellulose derivatives, etc. The interpolymers of rubber-like character retain their flexibility for a longer period than unmodified haloprene polymers. This is a marked advantage for many applications. Another advantage of the present invention is that it provides a method for preparing plastic haloprene polymers in good yield. When haloprenes are polymerized in the absence of other ingredients, the polymerization must be stopped before 20-40% of the haloprene has been polymerized or a non-plastic product is obtained which cannot be milled. By the methods of this invention much higher yields of plastic polymer can be obtained.

It is not only possible to dissolve many of these polymers in suitable solvents but, in addition, the solution or dispersion resulting from carrying out the polymerization in solution or emulsion may be employed in a variety of ways, for example, as rubber substitutes for the preparation of dipped, coated, extruded or impregnated articles or films may be cast from the liquid compositions. Thus the numerous processes described in U. S. Patent No. 1,967,863 may be applied to the products of this invention.

Many of the interpolymers such as that described in Example 8 have excellent pliability which makes them especially suitable for certain uses. For example, they may be calendered on to cloth for the preparation of coated fabrics of good quality, since they retain the properties of long life and resistance to various solvents and reagents which are characteristic of polymers of pure chloroprene. It is particularly pointed out that products of the type produced by Example 8 are adapted to be used in the form of solutions of the uncured polymer for coating and impregnating by the processes set forth in the patent last mentioned above. Further, the interpolymers may be compounded with reenforcing agents such as carbon black to produce further useful products.

The interpolymers of this invention may also be further treated to produce other products, also useful in a variety of ways. By way of example, the interpolymers may be halogenated or reacted with hydrohalogens under a variety of conditions, i. e. in solution, in the gaseous state or in the liquid state.

It is apparent that many widely different embodiments of this invention may be made without departing from the spirit and scope thereof and, therefore, it is not intended to be limited except as indicated in the appended claims.

We claim:

1. A polymer of chloro-2-butadiene-1,3 obtainable by polymerizing chloro-2-butadiene-1,3 in the presence of a vinyl compound of the group consisting of vinyl ethers, vinyl esters, vinyl carbinol (allyl alcohol) esters of vinyl carbinol, vinyl acetylenes, vinyl aromatic hydrocarbons and vinyl aromatic compounds consisting of carbon, hydrogen, halogen and alkoxy groups, the halogen and alkoxy groups being present as substituents on a carbon atom of an aromatic ring.

2. An elastic polymer of chloro-2-butadiene-1,3 obtainable by polymerizing chloro-2-butadiene-1,3 in the presence of a vinyl compound of the group consisting of vinyl ethers, vinyl esters, vinyl carbinol (allyl alcohol) esters of vinyl carbinol, vinyl acetylenes, vinyl aromatic hydrocarbons and vinyl aromatic compounds consisting of carbon, hydrogen, halogen and alkoxy groups, the halogen and alkoxy groups being present as substituents on a carbon atom of an aromatic ring.

3. A plastic polymer of chloro-2-butadiene-1,3 obtainable by polymerizing chloro-2-butadiene- 1,3 in the presence of a vinyl compound of the group consisting of vinyl ethers, vinyl esters, vinyl carbinol (allyl alcohol) esters of vinyl carbinol, vinyl acetylenes, vinyl aromatic hydrocarbons and vinyl aromatic compounds consisting of carbon, hydrogen, halogen and alkoxy groups, the halogen and alkoxy groups being present as substituents on a carbon atom of an aromatic ring.

4. A product obtainable by partially polymerizing chloro-2-butadiene-1,3 in the presence of a vinyl compound of the group consisting of vinyl ethers, vinyl esters, vinyl carbinol (allyl alcohol) esters of vinyl carbinol, vinyl acetylenes, vinyl aromatic hydrocarbons and vinyl aromatic compounds consisting of carbon, hydrogen, halogen and alkoxy groups, the halogen and alkoxy groups being present as substituents on a carbon atom of an aromatic ring, then separating a plastic mass from the unpolymerized material, and thereafter heating the plastic mass at about 125° C. until cured.

5. The process which comprises polymerizing chloro-2-butadiene-1,3 in the presence of a vinyl compound of the group consisting of vinyl ethers, vinyl esters, vinyl carbinol (allyl alcohol) esters of vinyl carbinol, vinyl acetylenes, vinyl aromatic hydrocarbons and vinyl aromatic compounds consisting of carbon, hydrogen, halogen and alkoxy groups, the halogen and alkoxy groups being present as substituents on a carbon atom of an aromatic ring.

6. The process which comprises completely polymerizing chloro-2-butadiene-1,3 in the presence of a vinyl compound of the group consisting of vinyl ethers, vinyl esters, vinyl carbinol (allyl alcohol) esters of vinyl carbinol, vinyl acetylenes, vinyl aromatic hydrocarbons and vinyl aromatic compounds consisting of carbon, hydrogen, halogen and alkoxy groups, the halogen and alkoxy groups being present as substituents on a carbon atom of an aromatic ring.

7. The process which comprises partially polymerizing chloro-2-butadiene-1,3 in the presence of a vinyl compound of the group consisting of vinyl ethers, vinyl esters, vinyl carbinol (allyl alcohol) esters of vinyl carbinol, vinyl acetylenes, vinyl aromatic hydrocarbons and vinyl aromatic compounds consisting of carbon, hydrogen, halogen and alkoxy groups, the halogen and alkoxy groups being present as substituents on a carbon atom of an aromatic ring, and then separating a plastic mass from the unpolymerized material.

8. The process which comprises partially polymerizing chloro-2-butadiene-1,3 in the presence of a vinyl compound of the group consisting of vinyl ethers, vinyl esters, vinyl carbinol (allyl alcohol) esters of vinyl carbinol, vinyl acetylenes, vinyl aromatic hydrocarbons and vinyl aromatic compounds consisting of carbon, hydrogen, halogen and alkoxy groups, the halogen and alkoxy groups being present as substituents on a carbon atom of an aromatic ring, then separating a plastic mass from the unpolymerized material, and thereafter heating the plastic mass at about 125° C. until cured.

9. The process which comprises dispersing, in water, chloro-2-butadiene-1,3 and a vinyl compound of the group consisting of vinyl ethers, vinyl esters, vinyl carbinol (allyl alcohol) esters of vinyl carbinol, vinyl acetylenes, vinyl aromatic hydrocarbons and vinyl aromatic compounds consisting of carbon, hydrogen, halogen and alkoxy groups, the halogen and alkoxy groups being present as substituents on a carbon atom of an aromatic ring, and thereafter polymerizing the chloro-2-butadiene-1,3 in the dispersed state.

10. The process which comprises polymerizing chloro-2-butadiene-1,3 in the presence of a vinyl compound of the group consisting of vinyl ethers, vinyl esters, vinyl carbinol (allyl alcohol) esters of vinyl carbinol, vinyl acetylenes, vinyl aromatic hydrocarbons and vinyl aromatic compounds consisting of carbon, hydrogen, halogen and alkoxy groups, the halogen and alkoxy groups being present as substituents on a carbon atom of an aromatic ring, and in the presence of a solvent for the two materials.

11. The process which comprises dispersing, in water, chloro-2-butadiene-1,3 and a vinyl compound of the group consisting of vinyl ethers, vinyl esters, vinyl carbinol (allyl alcohol) esters of vinyl carbinol, vinyl acetylenes, vinyl aromatic hydrocarbons and vinyl aromatic compounds consisting of carbon, hydrogen, halogen and alkoxy groups, the halogen and alkoxy groups being present as substituents on a carbon atom of an aromatic ring, then polymerizing the chloro-2-butadiene-1,3 in the dispersed state, and thereafter separating the polymer from the dispersing medium.

12. The process which comprises polymerizing chloro-2-butadiene-1,3 in the presence of a vinyl compound of the group consisting of vinyl ethers, vinyl esters, vinyl carbinol (allyl alcohol) esters of vinyl carbinol, vinyl acetylenes, vinyl aromatic hydrocarbons and vinyl aromatic compounds consisting of carbon, hydrogen, halogen, and alkoxy groups, the halogen and alkoxy groups being present as substituents on a carbon atom of an aromatic ring, and in the presence of a solvent for the two materials, and then separating the polymer from the solvent.

13. A polymer of a halogen-2-butadiene-1,3 obtainable by polymerizing a halogen-2-butadiene-1,3 in the presence of a vinyl compound consisting of vinyl ethers, vinyl esters, vinyl carbinol (allyl alcohol) esters of vinyl carbinol, vinyl acetylenes, vinyl aromatic hydrocarbons and vinyl aromatic compounds consisting of carbon, hydrogen, halogen and alkoxy groups, the halogen and alkoxy groups being present as substituents on a carbon atom of an aromatic ring.

14. The process which comprises polymerizing halogen-2-butadiene-1,3 in the presence of a vinyl compound of the group consisting of vinyl ethers, vinyl esters, vinyl carbinol (allyl alcohol) esters of vinyl carbinol, vinyl acetylenes, vinyl aromatic hydrocarbons and vinyl aromatic compounds consisting of carbon, hydrogen, halogen and alkoxy groups, the halogen and alkoxy groups being present as substituents on a carbon atom of an aromatic ring.

15. A polymer of a halogen-2-butadiene-1,3 obtainable by polymerizing a halogen-2-butadiene-1,3 in the presence of a low molecular weight vinyl compound of the group consisting of vinyl ethers, vinyl esters, vinyl carbinol (allyl alcohol) esters of vinyl carbinol, vinyl acetylenes, vinyl aromatic hydrocarbons and vinyl aromatic compounds consisting of carbon, hydrogen, halogen and alkoxy groups, the halogen and alkoxy groups being present as substituents on a carbon atom of an aromatic ring.

16. A polymer of chloro-2-butadiene-1,3 obtainable by polymerizing chloro-2-butadiene-1,3 in the presence of a low molecular weight vinyl compound of the group consisting of vinyl ethers, vinyl esters, vinyl carbinol (allyl alcohol) esters of vinyl carbinol, vinyl acetylenes, vinyl aromatic hydrocarbons and vinyl aromatic compounds consisting of carbon, hydrogen, halogen and alkoxy groups, the halogen and alkoxy groups being present as substituents on a carbon atom of an aromatic ring.

17. A polymer of chloro-2-butadiene-1,3 obtainable by polymerizing chloro-2-butadiene-1,3 in the presence of a vinyl ether.

18. A polymer of chloro-2-butadiene-1,3 obtainable by polymerizing chloro-2-butadiene-1,3 in the presence of a vinyl ester.

19. A polymer of chloro-2-butadiene-1,3 obtainable by polymerizing chloro-2-butadiene-1,3 in the presence of a vinyl aromatic hydrocarbon.

20. A polymer of chloro-2-butadiene-1,3 obtainable by polymerizing chloro-2-butadiene-1,3 in the presence of vinyl butyl ether.

21. A polymer of chloro-2-butadiene-1,3 obtainable by polymerizing chloro-2-butadiene-1,3 in the presence of vinyl acetate.

22. A polymer of chloro-2-butadiene-1,3 obtainable by polymerizing chloro-2-butadiene-1,3 in the presence of styrene.

23. The process which comprises dissolving styrene in chloro-2-butadiene-1,3, then emulsifying the solution in water, and thereafter polymerizing the chloro-2-butadiene-1,3 in the dispersed state.

24. A process for the polymerization of chloro-2-butadiene-1,3 which comprises heating a mixture comprising chloro-2-butadiene-1,3, vinyl acetate, an inert solvent and a polymerization catalyst.

25. A process for the polymerization of chloro-2-butadiene-1,3 which comprises heating a mixture comprising chloro-2-butadiene-1,3, vinyl butyl ether and a polymerization catalyst.

26. A dispersion obtainable by dispersing in water chloro-2-butadiene-1,3 and a vinyl compound of the group consisting of vinyl ethers, vinyl esters, vinyl carbinol (allyl alcohol) esters of vinyl carbinol, vinyl acetylenes, vinyl aromatic hydrocarbons and vinyl aromatic compounds consisting of carbon, hydrogen, halogen and alkoxy groups, the halogen and alkoxy groups being present as substituents on a carbon atom of an aromatic ring, and thereafter polymerizing the chloro-2-butadiene-1,3 in the dispersed state.

WALLACE H. CAROTHERS.
ARNOLD M. COLLINS.
JAMES E. KIRBY.

CERTIFICATE OF CORRECTION.

Patent No. 2,066,330.

January 5, 1937.

WALLACE H. CAROTHERS, ET AL.

It is hereby certified that error appears in the printed specification of the above numbered patent requiring correction as follows: Page 1, second column, line 49, for "smulsion" read emulsion; page 5, second column, line 41, claim 13, after the word "compound" insert of the group; and that the said Letters Patent should be read with these corrections therein that the same may conform to the record of the case in the Patent Office.

Signed and sealed this 23rd day of March, A. D. 1937.

(Seal)

Henry Van Arsdale
Acting Commissioner of Patents.

hydrocarbons and vinyl aromatic compounds consisting of carbon, hydrogen, halogen and alkoxy groups, the halogen and alkoxy groups being present as substituents on a carbon atom of an aromatic ring.

17. A polymer of chloro-2-butadiene-1,3 obtainable by polymerizing chloro-2-butadiene-1,3 in the presence of a vinyl ether.

18. A polymer of chloro-2-butadiene-1,3 obtainable by polymerizing chloro-2-butadiene-1,3 in the presence of a vinyl ester.

19. A polymer of chloro-2-butadiene-1,3 obtainable by polymerizing chloro-2-butadiene-1,3 in the presence of a vinyl aromatic hydrocarbon.

20. A polymer of chloro-2-butadiene-1,3 obtainable by polymerizing chloro-2-butadiene-1,3 in the presence of vinyl butyl ether.

21. A polymer of chloro-2-butadiene-1,3 obtainable by polymerizing chloro-2-butadiene-1,3 in the presence of vinyl acetate.

22. A polymer of chloro-2-butadiene-1,3 obtainable by polymerizing chloro-2-butadiene-1,3 in the presence of styrene.

23. The process which comprises dissolving styrene in chloro-2-butadiene-1,3, then emulsifying the solution in water, and thereafter polymerizing the chloro-2-butadiene-1,3 in the dispersed state.

24. A process for the polymerization of chloro-2-butadiene-1,3 which comprises heating a mixture comprising chloro-2-butadiene-1,3, vinyl acetate, an inert solvent and a polymerization catalyst.

25. A process for the polymerization of chloro-2-butadiene-1,3 which comprises heating a mixture comprising chloro-2-butadiene-1,3, vinyl butyl ether and a polymerization catalyst.

26. A dispersion obtainable by dispersing in water chloro-2-butadiene-1,3 and a vinyl compound of the group consisting of vinyl ethers, vinyl esters, vinyl carbinol (allyl alcohol) esters of vinyl carbinol, vinyl acetylenes, vinyl aromatic hydrocarbons and vinyl aromatic compounds consisting of carbon, hydrogen, halogen and alkoxy groups, the halogen and alkoxy groups being present as substituents on a carbon atom of an aromatic ring, and thereafter polymerizing the chloro-2-butadiene-1,3 in the dispersed state.

WALLACE H. CAROTHERS.
ARNOLD M. COLLINS.
JAMES E. KIRBY.

CERTIFICATE OF CORRECTION.

Patent No. 2,066,330.                                   January 5, 1937.

WALLACE H. CAROTHERS, ET AL.

It is hereby certified that error appears in the printed specification of the above numbered patent requiring correction as follows: Page 1, second column, line 49, for "smulsion" read emulsion; page 5, second column, line 41, claim 13, after the word "compound" insert of the group; and that the said Letters Patent should be read with these corrections therein that the same may conform to the record of the case in the Patent Office.

Signed and sealed this 23rd day of March, A. D. 1937.

(Seal)

Henry Van Arsdale
Acting Commissioner of Patents.

CERTIFICATE OF CORRECTION.

Patent No. 2,066,330.  January 5, 1937.

WALLACE H. CAROTHERS, ET AL.

It is hereby certified that error appears in the printed specification of the above numbered patent requiring correction as follows: Page 1, second column, line 49, for "smulsion" read emulsion; page 5, second column, line 41, claim 13, after the word "compound" insert of the group; and that the said Letters Patent should be read with these corrections therein that the same may conform to the record of the case in the Patent Office.

Signed and sealed this 23rd day of March, A. D. 1937.

(Seal)

Henry Van Arsdale
Acting Commissioner of Patents.